Oct. 2, 1951  G. E. ZWEIFEL ET AL  2,569,842
SAWMILL HYDRAULIC CARRIAGE ASSEMBLY
Filed March 12, 1947
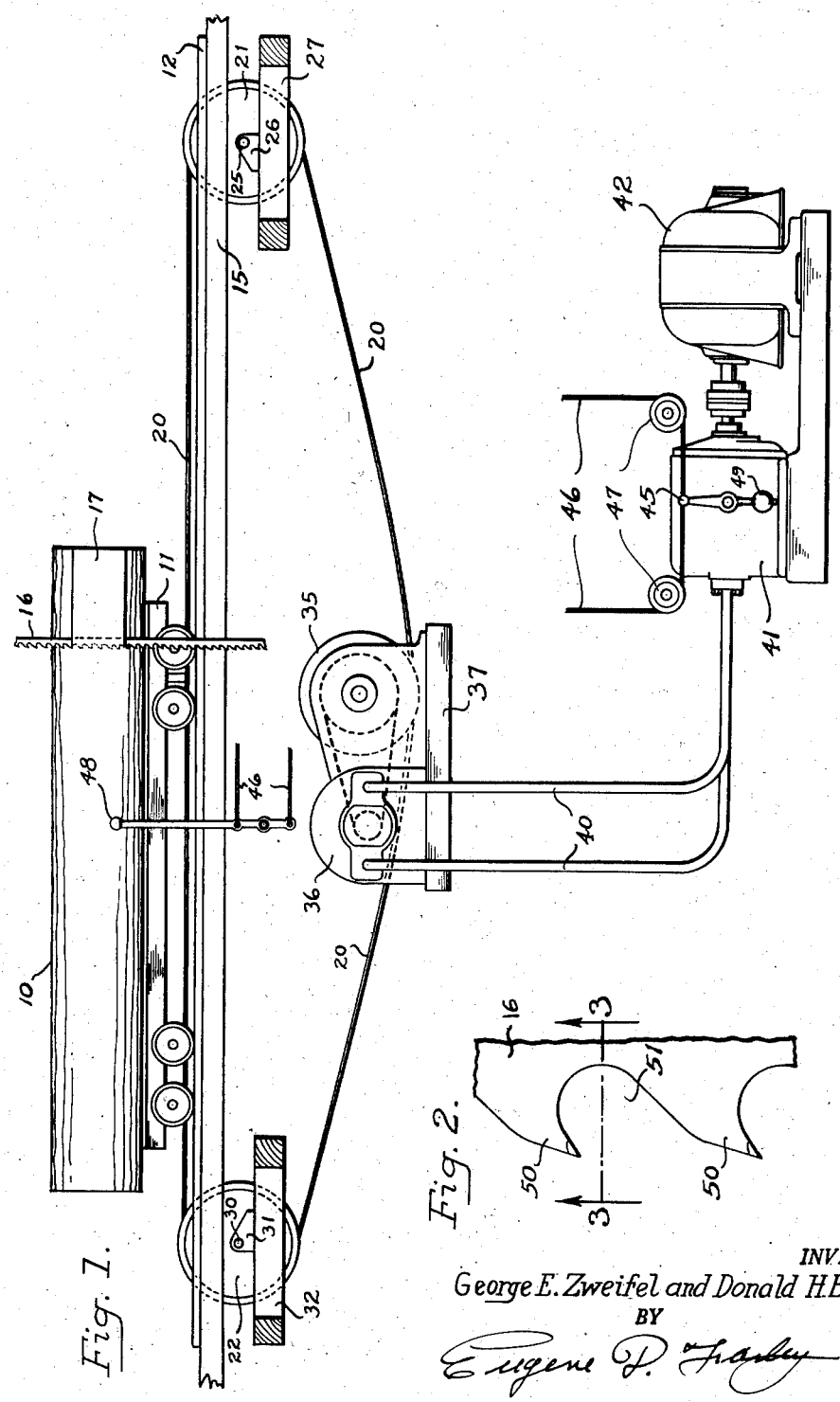
INVENTORS
George E. Zweifel and Donald H. Bookhultz
BY
Eugene D. Farley
Atty.

Patented Oct. 2, 1951

2,569,842

UNITED STATES PATENT OFFICE 2,569,842

SAWMILL HYDRAULIC CARRIAGE ASSEMBLY

George E. Zweifel and Donald H. Bookhultz, Portland, Oreg., assignors to George E. Zweifel & Company, Portland, Oreg., a partnership Application March 12, 1947, Serial No. 734,250

2 Claims. (Cl. 143—108)

The present invention relates to a carriage assembly for use in sawmills and more particularly pertains to hydraulically actuated apparatus for use in moving logs or cants into repeated contact with the blade of a power driven saw, whereby to saw them into boards.

It is common practice to saw logs into boards by placing them on a sawmill carriage, which is reciprocated with respect to a power driven saw. As the carriage is advanced against the saw, a cut is made through the log to form a board. The direction of motion of the carriage is then reversed, the log shifted a desired amount in a lateral direction, and another pass made to cut off another board. By repeating this operation as often as is necessary, the log may be entirely reduced to boards of a predetermined width.

Because of the manner of construction of a saw, the rate at which the log is moved is of critical importance in determining the efficiency of the sawing operation and the quality of the product obtained. A saw comprises a plurality of teeth on a body portion comprising a blade or disc. Between the teeth are cavities termed "gullets." These serve the function of carrying away the sawdust cut from the log by the cutting points of the teeth. The width of the cutting points is greater than that of the body portion of the saw in order to allow a clearance between the latter and the solid wood on either side. The body of the saw thus is enabled to move freely and without binding or friction within the cut formed by the action of the teeth on the log.

It will be apparent, therefore, that if the rate at which a log is driven against a stationary power saw is too slow, the saw will not cut enough wood to fill the gullets completely and as a consequence the saw will operate at only part efficiency. It will also consume more power by cutting the sawdust too fine. If, on the other hand, the rate is too great, more sawdust is formed than can be carried away in the gullets. The surplus sawdust packs and wedges into the space between the blade of the saw and the solid wood on either side with the result that the saw does not have free clearance and friction develops. This causes the blade of the saw to heat up, whereupon it loses its tension and wavers so that a true cut is not obtained. There is thus a certain optimum speed at which the log must be advanced against the saw if maximum cutting efficiency and optimum performance of the saw are to be obtained.

Uniform operation of the carriage at optimum cutting speeds is made difficult by at least two factors, i. e. the variable loads placed upon the carriage drive and the lack of sensitivity of the carriage drive mechanisms of the prior art to changes in control settings. Variable loads are imposed upon the drive because of the fact that considerable power must be applied initially to start the loaded carriage from its position of rest and advance it toward the saw. Further power application is required at the moment of impact between the saw and the log to overcome shock load. Then, as the saw progresses through the log, it passes through areas of varying resistance. It encounters, for example, sections of increased diameter and obstacles such as stones, pieces of metal and large knots, through which it cuts slowly. In these situations it is necessary to decelerate or stop the motion of the carriage in order to avoid damage to the saw. The saw also encounters cavities, decayed areas and pitch pockets which offer but relatively little resistance, when the motion of the carriage may be accelerated. Finally, when the cut is completed, the carriage runs free of the saw and tends to accelerate suddenly and greatly because of its momentum.

In addition, uniform operation of the carriage at optimum cutting speeds has been made difficult, if not impossible, by the fact that prior art driving mechanisms have not been subject to positive, precise control. Such driving mechanisms have included electric motors, steam engines, and pneumatic engines. The operating speed of each of these power sources is an inverse function of the load placed upon it. Any fluctuation in load produces a corresponding change in speed. Thus when the load is increased, the speed is reduced. To compensate for this it is necessary to increase the power in order to carry the increased load. Conversely when the load is decreased, the speed tends to increase and it is then necessary to reduce the power applied to maintain a normal operating speed. The behavior of these power sources under fluctuating load is thus such that they tend continually to depart from the normal speed, whereupon it is necessary to return them to such speed by repeated manipulations of the control.

Hence in order to move the carriage at optimum rates throughout the entire cut, it is necessary for the sawyer to estimate the effect of changing loads upon the speed of the carriage. He must gauge the amount by which the carriage will be decelerated when the saw first bites into the log and how much it will be decelerated and accelerated as the saw meets areas of increased and decreased resistance, respectively, as it traverses the log. Finally, he must estimate at what point toward the end of the cut he must slow down the carriage in order to avoid undue acceleration of the carriage when the sawing load is released altogether. Under present practice, this point lies from six feet to eight feet from the end of the log. He must then manipulate his controls so that optimum speeds are approached as closely as possible throughout the entire pass. Although a sawyer develops great skill in so doing, the limitations of the driving mechanism are such as to make precise control of the carriage speed a virtual impossibility with the result that the saw is operating at less than its full capacity during certain portion of the cut, and at more than its capacity during others. As explained above, this lowers the quality of the lumber sawed as well as the efficiency of the sawing operation. It also makes the efficient operation of the entire mill largely dependent upon the presence on its operating staff of a sawyer of large experience and great skill.

Although the inability to control the velocity of the carriage with a sufficient degree of precision constitutes a primary disadvantage of the carriage actuating means of the prior art, other disadvantages also are present. The necessity of using steam power plants, steam lines and steam cylinders in a steam drive creates a definite fire hazard and is in part responsible for the high fire insurance rates applicable to sawmill coverage. The use of electric motors is disadvantageous since the velocity of operation is variable stepwise only and they cannot be controlled with the precision required to feed a saw successfully. Furthermore, they are difficult to reverse, expensive and usually are dependent upon a source of direct current, which is not available to the average mill.

It is therefore the general object of the present invention to provide an apparatus for moving a log or other large piece of wood against a power driven saw at optimum cutting velocities.

It is a further object to provide a sawmill carriage assembly which will move at a rate which is independent of the load placed upon it.

It is a further object to provide an apparatus for moving a log against a power driven saw, the direction and speed of motion of which apparatus are subject to positive control.

It is a further object to provide a sawmill carriage assembly which will cooperate with a power driven saw in such a manner that each tooth of the saw will exert maximum and optimum cutting action during the cutting operation.

The manner in which the foregoing and other objects of the invention are accomplished will be apparent from a consideration of the accompanying specification and claims, taken together with the accompanying drawings wherein:

Figure 1 is a diagrammatic side view of the sawmill carriage assembly of the invention illustrated in the act of moving a log against the cutting edge of a power driven saw;

Figure 2 is an enlarged side view of a portion of a saw such as is illustrated in Figure 1, illustrating the form and manner of arrangement of the teeth; and Figure 3 is a cross sectional view of a portion of a saw taken along the line 3—3 of Figure 2.

In Figure 1, a log which is in the process of being sawed into boards is represented by the numeral 10. The log is positioned upon the wheeled vehicle 11, commonly termed a log carriage, which moves on tracks, one of which is indicated at 12. The tracks in turn are mounted on the platform 15. Centrally located with respect to the platform is the saw 16 which, in the form illustrated, is a band saw. This is represented in the act of sawing through the log to form the slab 17.

Actuation of the carriage is obtained through the elongated flexible member, or cable, indicated at 20, 20, 20, attached to the carriage in such a manner that the latter may be reciprocated with respect to the saw. This is accomplished by passing the cable over and around circular members, which preferably are in the form of grooved pulleys, or sheaves in substantial alignment with each other. One sheave 21 is located forwardly of the carriage, while the other sheave, 22, is positioned toward the rear. The front sheave may be supported through the axle 25 journalled into the sheave box 26 which is anchored to a beam or other structural member 27. The rear sheave is supported similarly through the axle 30 extending into the rear sheave box 31 which is attached to the structural member 32. It usually is preferable to have one or both of the sheaves adjustable with respect to the cable so as to make possible taking up slack therein, as by means of a take-up yoke.

To enable moving the cable, and hence of the carriage to which it is attached, the cable is wound around a cylindrical member or drum, indicated at 35. It will be apparent that as the drum rotates in a clockwise direction, the length of the cable attached to the front end of the carriage will be shortened, thereby drawing the carriage, and the log resting thereon, toward the cutting edge of the saw. Conversely, as the drum is rotated in a counterclockwise direction, the carriage will be moved in a direction which is away from the cutting edge of the saw. There thus is provided a means for moving the carriage from a position in front of a saw toward and against the same until the cut is made and then reversing the direction of motion of the carriage until it has returned to its starting position. By making a series of passes in this manner, the log being shifted in a lateral direction with respect to the saw at each pass, a log resting on the carriage may be reduced to smaller pieces.

The drum 35 is caused to rotate by means of the constant displacement hydraulic motor 36, which operatively is connected to the drum in any suitable manner, as by means of a belt and pulleys, a gear reduction train, or otherwise. Both motor and drum are mounted together on a platform or supporting structure 37 which preferably is positioned directly below the track on which the carriage moves, thereby placing the drum 35 in substantial alignment with the sheaves 21 and 22.

Hydraulic fluid is supplied to the motor 36 through the lines indicated at 40. These in turn are attached to the pump 41 which is driven by any suitable source of power, as by the electric motor 42. The pump 41 is of the variable displacement, two-directional type having an overload capacity which is less than that of the electric motor 42. It can supply a variable amount of hydraulic fluid to the hydraulic motor 36, the fluid being delivered through either of the lines 40 at the option of the operator. The quantity of fluid delivered by the pump, and the direction of flow of the fluid is controlled through the single control lever 45, connected to the cables 46 passing over the pulleys 47. The cables 46 preferably are attached to the sawyer's lever 48 mounted on the platform in the vicinity of the saw. It affords the only means required by the sawyer for controlling the direction and rate of motion of the carriage.

As a safety measure, it is desirable to include in the control circuit the weighted member 49, attached to the lever 45. This member serves the purpose of automatically returning the lever 45 to a neutral position, and hence of stopping the carriage before damage is done, in the event of failure of the cable 20.

During operation of the apparatus, the electric motor 42 is caused to run at a predetermined speed. Since its overload capacity is greater than that of the pump 41, this speed remains constant during the entire period of operation of the apparatus regardless of the load placed upon the carriage drive. It drives the rotor of the variable displacement pump likewise at a constant speed. When the rotor is in idling position, no hydraulic fluid is delivered to the hydraulic motor 36. However, when the sawyer desires to move the carriage with respect to the saw, suitable movement of the sawyer's lever 48 on the platform will effect a corresponding adjustment of the pump control lever 45 through the cables 46, thereby causing the pump to deliver a variable quantity of fluid through one of the lines 40 to the hydraulic motor 36. This causes the drum 35 to revolve, thereby moving the cable 20 and causing the carriage 11 to move.

Since hydraulic fluid is incompressible, pumping a given quantity through the motor causes it to run at a corresponding speed which is independent of the load as long as the motor is operating within its rated capacity. The speed of the motor and of the carriage which it drives, is also steplessly variable and instantly responsive to changes of control. Hence as the log is fed to the saw, the speed of the carriage may be controlled precisely at optimum values throughout the entire pass. When it is necessary to reduce the speed of the carriage, as when the saw is traversing large knots or areas of increased diameter, or when it encounters obstacles such as stones and pieces of metal, the speed may instantly be reduced to any desired extent, or stopped altogether, thereby avoiding damage to the saw. Similarly when the saw is traversing areas of relatively low resistance, the carriage speed readily may be increased to an optimum level. Finally, the carriage speed may be maintained at a high level substantially to the end of the cut, since its motion may be reversed quickly and without danger of the carriage "running away from itself" as might occur upon release of the load when steam or air engines are used as power sources.

As a result, the carriage may be driven throughout substantially the entire cut at a speed such that the saw is operating at maximum efficiency. At this speed, the teeth, indicated at 50, 50 of Figures 2 and 3, cut just sufficient wood completely to fill with sawdust the cavities or gullets 51 located therebetween. The sawdust then will be carried free of the log without wedging in the space between the log and the body of the saw, which space is determined by the difference between the width of the tooth, as indicated by the dimension $a$ of Figure 3, and the cross section $b$ of the saw body. Hence, the saw is able to move freely without binding or the development of friction sufficient to cause it to lose its tension and waver, and a straight even cut is obtained.

Having now described our invention in a preferred embodiment, what we claim as new and desire to protect by Letters Patent is:

1. A sawmill carriage assembly which comprises a sawmill carriage adapted to reciprocate with respect to a saw, a rotary, hydraulic motor, means for operatively interconnecting the hydraulic motor and the sawmill carriage, a rotary hydraulic pump, conduit means interconnecting the hydraulic pump and the hydraulic motor, motor means for driving the hydraulic pump, valve means for controlling the volume and direction of flow of hydraulic fluid pumped through the hydraulic motor from the hydraulic pump, and hence for determining the speed and direction of motion of the sawmill carriage, a counterweighted lever arm attached to the valve means, a lever pivotally mounted intermediate its ends adjacent the sawyer and remote from the valve means, and a cable interconnecting the lever and the lever arm of the valve means, the lever acting through the cable being adapted to displace the valve means from a neutral position against the gravitational force exerted by the counterweight, the counterweight being adapted to return the valve to neutral position in the event of failure of the cable, thereby shutting off the flow of hydraulic fluid through the hydraulic circuit and arresting the motion of the sawmill carriage.

2. A sawmill carriage assembly which comprises a sawmill carriage adapted to reciprocate with respect to a saw, a rotary hydraulic motor, means for operatively interconnecting the hydraulic motor and the sawmill carriage, a rotary hydraulic pump, conduit means interconnecting the hydraulic pump and the hydraulic motor, motor means for driving the hydraulic pump, valve means for controlling the volume and direction of flow of hydraulic fluid pumped through the hydraulic motor from the hydraulic pump, a lever arm attached to the valve means and associated with tensioning means actuated by movement of the lever arm, a lever pivotally mounted intermediate its ends adjacent the saw and remote from the valve means, and flexible interconnecting means for interconnecting the lever with the lever arm of the valve means, the lever acting through the flexible interconnecting means being adapted to displace the valve means from a neutral position against the force exerted by the tensioning means, and the tensioning means being adapted to return the valve to its neutral position in the event of failure of the flexible interconnecting means, thereby shutting off the flow of hydraulic fluid through the hydraulic circuit and arresting the motion of the sawmill carriage.

GEORGE E. ZWEIFEL.
DONALD H. BOOKHULTZ.

REFERENCES CITED

The following references are of record in the file of this patent:

UNITED STATES PATENTS

| Number | Name | Date |
|---|---|---|
| 203,467 | Lamb | May 7, 1878 |
| 334,664 | Hinkley | Jan. 19, 1886 |
| 1,056,032 | Kitchen | Mar. 18, 1913 |
| 1,359,679 | Fee | Nov. 23, 1920 |
| 2,056,896 | Douglas | Oct. 6, 1936 |
| 2,234,009 | Robinson | Mar. 4, 1941 |
| 2,401,680 | Eaton | June 4, 1946 |